3,042,658
PROCESS FOR PRODUCING POLY-
ETHYLENEUREA
William H. Libby, St. Paul, Minn., assignor to Minnesota
Mining and Manufacturing Company, St. Paul, Minn.,
a corporation of Delaware
No Drawing. Filed June 1, 1959, Ser. No. 817,089
4 Claims. (Cl. 260—77.5)

This invention relates to certain new high melting polycarbonamides and more particularly to polyethyleneurea and the process for its preparation.

It is well known that cyclic monomers which contain 5-membered rings are extremely difficult to polymerize, and many such compounds have now been investigated with little success. It has now been discovered, however, that despite its 5-membered ring system, ethylene urea (also designated as 2-imidazolidinone) can be polymerized under certain conditions to form high-melting polymers.

It is an object of this invention to provide novel polymers derived from ethylene urea and a process for their production. A further object is to provide solid polycarbonamides. Other objects will become apparent hereinafter.

In accordance with the above and other objects of this invention it has been found that ethylene urea polymerizes in the presence of certain basic catalysts, preferably with the addition of an amount of an initiator, to produce high melting linear polycarbon amides. For convenience, these polymers may be referred to as polyethyleneurea. They can also be termed polymers of 2-imidazolidinone, or polyimidazolidinone; but the somewhat shorter designations "polymers of ethylene urea" and "polyethyleneurea" will be used hereinafter.

Ethylene urea is a 5-membered heterocyclic compound which can be represented by the formula:

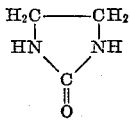

When polymerized, ethylene urea gives rise to linear polymers which are high-melting substances believed to have the general formula:

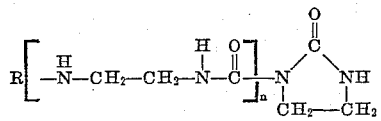

wherein $n$ is an integral number but may have non-integral average values, since the solid polymer may consist of a number of individual polymer chains of longer or shorter chain length; and R is a terminal group. It is noted that variations in the terminal R group are possible within the scope of the invention as hereinafter described and that the imidazolidinone ring structure may or may not occur in the final polymer as the other terminal group. The principal characteristic of the solid high-melting polymers of the invention is the recurring group

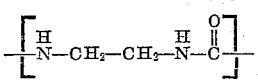

which appears to be present in chains of substantial length, probably at least 10 or more such groups being present and quite probably up to 100 or more, that is $n$ has values greater than about 10 and up to about 100.

The terminal R group may be hydrogen or, more commonly, is an acyl group such as acetyl, benzenesulfonyl, propanesulfonyl, phenylcarbamyl or the like, which is derived from the particular initiators which may be added or which may be present fortuitously.

It is a surprising feature of the polymers of this invention that they are exceptionally high-melting. Most linear polycarbonamides melt in the range of about 200° to 300° C. or below, but the polymers of this invention appear to have no true melting point. At temperatures above about 350° C. and when openly exposed to air, they show some tendency toward decomposition; but with the exclusion of air and particularly oxygen, they are thermoplastic and can be molded into desired shapes which are stable at elevated temperatures. The use of high pressures in molding enables the use of somewhat lower temperatures, for example, they can be molded at about 300° C. at 8–10,000 p.s.i. The solid polymer may also be fabricated into structures of various kinds by sawing, filing, carving and the like.

Broadly speaking, polyethyleneurea is produced when ethylene urea is subjected to the action of a basic catalyst at a temperature in the range of about 100° to about 200° C. and preferably at about 120° to about 150° C. Initiators and/or solvents can be used, as desired. The ethylene urea, which melts at about 132° C. when quite pure, requires that the polymerization mixture be heated to at least that temperature when no solvent is present so that the catalyst becomes effective. The polymerization as described herein is carried out under substantially anhydrous conditions.

Advantageously, the ethylene urea (which can be prepared by the method of U.S. Patent No. 2,517,750) is purified, for example by recrystallization from xylene; and predetermined amounts of an initiator such as acetyl chloride, N-acetyl-ethylene urea, N-benzenesulfonyl ethylene urea, phenyl isocyanate, acetic anhydride, adipyl dichloride or the like are added to the polymerization reaction mixture. The initiators contain or bring about formation of an amide group with at least one of the nitrogen atoms of the ethylene urea and thus may be termed "amidating initiators" for convenience. Formation of the amide group apparently facilitates opening of the ring, which can then react with a second ring to open the latter, and so on. However, applicant is not to be bound by this theory of the mechanism involved, which is proposed only by way of a possible explanation of the action of the initiator. The preferred amount of initiator is about 0.05 to about 1 mole percent of the amount of ethylene urea although larger amounts can be used and these generally result in polymer having lower molecular weight. While the polymerization reaction proceeds in the absence of added initiators or smaller amounts of initiators than those specified, it is somewhat slower in rate under these conditions and may also produce polymer in lower yields.

The basic catalyst which is used can be an alkali metal or a compound of an alkali metal such as the hydroxide, oxide, hydride, amide or other strong base capable of forming a salt with ethylene urea. Thus sodium, potassium, lithium, their oxides, hydroxides, hydrides or amides are suitable for the purpose. Alkali metal salts of ethylene urea or of other very weak acids such as the potassium salt of ethylene urea, sodium pyrrolidone, potassium caprolactam, sodium propane sultam and the like can also be used as polymerization catalysts. In general, the amount of basic catalyst used is from about 25 to about 50 times the amount of activator on a mole percent basis, the higher proportions being used when lesser amounts of the activator are used. Preferably, about 0.1 to about 10 mole percent of catalyst is employed.

Polyethyleneurea is a white, hard solid which is soluble in concentrated sulfuric acid, formic acid (98%), 85% phosphoric acid, and a mixture of equal parts of phosphoric acid and methanol; and is insoluble in common organic solvents and water. It melts above 300° C. or higher depending on the criterion of melting and the higher molecular weight polymers are strong, tough materials.

The following examples more particularly illustrate the invention and are not to be construed as limiting. In these examples all parts are by weight and inherent viscosities are determined in solution in concentrated sulfuric acid.

Example 1

An anhydrous mixture of 30 parts of ethylene urea (melting point about 131 C.) and 0.98 part (5 mole percent) of potassium hydroxide is produced by warming an ampoule containing the ethylene urea and a solution of the potassium hydroxide in about 1 part of water under high vacuum ($10^{-2}$ mm. Hg pressure) until water is no longer visible and then adding about 15 parts of xylene and further distilling to remove this. The vessel is then flushed with pure nitrogen and 0.27 part (one mole percent) of acetyl chloride is added and the ampoule is frozen, evacuated, sealed and heated at 140° C. for 24 hours. The ampoule is cooled, opened and the contents diluted with water. The polyethyleneurea formed in the reaction is an insoluble powder which is recovered by filtration. After washing with hot water and drying, the polymer is found to be a white powder which is insoluble in water and most organic solvents. It melts above 300° C. The inherent viscosity, determined using a concentration of 0.308 g. per 100 ml. of concentrated sulfuric acid, is 0.174.

Example 2

A suspension of the potassium salt of ethylene urea is prepared by distilling 45 parts of xylene from a mixture of 90 parts of xylene, 10 parts of ethylene urea and 0.325 part (5 mole percent) of potassium hydroxide dissolved in about 1 part of water. To the suspension of potassium salt of ethylene urea is added 0.0091 part (0.1 mole percent) of acetyl chloride in xylene and the mixture is refluxed with rapid stirring for 24 hours. The resultant polymer is collected by filtration, washed thoroughly with water and dried. The white powdery polyethyleneurea is obtained in 67 percent yield and has an inherent viscosity of 0.189, determined in concentration of 0.308 g./100 ml. of concentrated sulfuric acid.

Example 3

The proportions of dry ingredients of Example 2 are used without solvent present during the polymerization step and heating for 24 hours at about 133 to 142° C. The polymer is isolated as described in Example 1. The yield is greater than 50 percent of theoretical. The white powder melts above 300° C. and has an inherent viscosity of 0.166 determined as set forth in Example 2. Similar results are obtained when other indirect initiators such as phenyl isocyanate, benzoyl chloride, benzenesulfonyl chloride and propanesulfonyl chloride and when direct initiators such as N-acetylpyrrolidone, N-acetyl-ethylene urea, N-benzenesulfonyl ethylene urea, N-phenyl carbamyl ethylene urea and acetyl thiourea are used in amounts of about 0.05 to 1.0 mole percent in place of the acetyl chloride.

Example 4

When the polyethyleneurea of the above examples is molded at 315° C. and 8000 p.s.i. pressure, solid articles can be produced, such as buttons, plugs for electronic equipment and the like. Using the polymer of Example 1, with a two-part die having a cylindrical cavity of 1" diameter and a depth of ⅛", a hard disc is produced which is of ivory color. It is a useful insulating spacer for electrical equipment and can be sawed or drilled using ordinary metal-working tools.

I claim:
1. The process for producing polyethyleneurea which comprises heating cyclic ethylene urea to a temperature in the range of about 100° to 200° C. in the presence of a strongly basic catalyst for the polymerization selected from the class consisting of alkali metals, alkali metal oxides, alkali metal hydroxides, alkali metal hydrides, alkali metal amides, and alkali metal salts with weak acids having acidity of the order of that of ethyleneurea, and isolating solid polyethyleneurea from the polymerization mixture.

2. The process for producing polyethyleneurea which comprises heating cyclic ethyleneurea to a temperature in the range of about 100 to 200° C. in the presence of a strongly basic catalyst for the polymerization selected from the class consisting of alkali metals, alkali metal oxides, alkali metal hydroxides, alkali metal hydrides, alkali metal amides and alkali metal salts with weak acids having acidity of the order of that of ethyleneurea, and in the added presence of an activator for the polymerization chosen from the class consisting of indirect initiators of the group consisting of acetyl chloride, phenyl-isocyanate, benzoylchloride, benzenesulfonyl fluoride and propane sulfonyl fluoride and direct initiators of the group consisting of N-acetyl pyrrolidone, N-acetyl-ethyleneurea, N-benzenesulfonyl ethyleneurea, N-phenylcarbamyl ethyleneurea and acetylthiourea.

3. The process for producing polyethyleneurea which comprises heating cyclic ethyleneurea to a temperature in the range of about 100 to 200° C. in the presence of from about 0.1 to about 10 mole percent of a strongly basic catalyst for the polymerization selected from the class consisting of alkali metals, alkali metal oxides, alkali metal hydroxides, alkali metal hydrides, alkali metal amides and alkali metal salts with weak acids having acidity of the order of that of ethyleneurea, and isolating solid polyethyleneurea from the polymerization mixture.

4. The process of claim 3, in which the catalyst is an alkali metal salt of ethyleneurea.

References Cited in the file of this patent

UNITED STATES PATENTS

| | | |
|---|---|---|
| 2,292,443 | Hanford | Aug. 11, 1942 |
| 2,501,783 | Morgan | Mar. 28, 1950 |
| 2,852,494 | Lehmann et al. | Sept. 16, 1958 |
| 2,855,384 | Lehmann | Oct. 7, 1958 |